(12) United States Patent
Takata et al.

(10) Patent No.: US 8,372,922 B2
(45) Date of Patent: Feb. 12, 2013

(54) ONE COMPONENT EPOXY RESIN COMPOSITION AND MOTOR OR DYNAMO USING THE SAME

(75) Inventors: Tetsushi Takata, Tokyo (JP); Takayuki Kawano, Tokyo (JP)

(73) Assignee: Somar Corporation, Tokyo (JP)

( * ) Notice: Subject to any disclaimer, the term of this patent is extended or adjusted under 35 U.S.C. 154(b) by 21 days.

(21) Appl. No.: 12/440,694

(22) PCT Filed: Sep. 11, 2007

(86) PCT No.: PCT/JP2007/067654
§ 371 (c)(1),
(2), (4) Date: Jan. 4, 2010

(87) PCT Pub. No.: WO2008/032704
PCT Pub. Date: Mar. 20, 2008

(65) Prior Publication Data
US 2010/0113649 A1    May 6, 2010

(51) Int. Cl.
*C08K 9/10*    (2006.01)
*C08L 63/02*    (2006.01)
*H02K 19/00*    (2006.01)
*H02K 21/04*    (2006.01)

(52) U.S. Cl. ......... 525/526; 523/211; 525/524; 525/533

(58) Field of Classification Search .................. None
See application file for complete search history.

(56) References Cited

U.S. PATENT DOCUMENTS

2005/0004270 A1* 1/2005 Rocks et al. .................. 523/400

FOREIGN PATENT DOCUMENTS

| EP | 73736 A1 | * | 3/1983 |
| JP | 63251417 A | | 10/1988 |
| JP | 3-17118 A | * | 1/1991 |
| JP | 03174434 A | | 7/1991 |
| JP | 3-281625 A | * | 12/1991 |
| JP | 07126575 A | | 5/1995 |
| JP | 9-162001 A | * | 6/1997 |
| JP | 2000198831 A | | 7/2000 |
| JP | 2001011291 A | | 1/2001 |
| JP | 2001288334 A | | 10/2001 |
| JP | 2002145996 A | | 5/2002 |
| JP | 2007-197572 A | * | 8/2007 |

OTHER PUBLICATIONS

English translation and abstracts for Japanese Patent No. 7-126575, Matsumura, May 16, 1995, 13 pages.*
English translation and abstracts for Japanese Patent No. 2001-11291, Ikeda et al., Jan. 16, 2001, 14 pages.*
English translation and abstracts for Japanese Patent No. 2001-288334, Ikeda et al., Oct. 16, 2001, 19 pages.*
English translation and abstracts for Japanese Patent No. 2002-145996, Yamamoto et al., May 22, 2002, 22 pages.*
HCAPLUS accession No. 1965:489778 for Netherlands Patent No. 6,504,681, Shell Internationale Research Maatschappij NV, Jun. 26, 1965, two pages.*
HCAPLUS accession No. 1966:68626 for the American Chemical Society, Division of Organic Coatings, Plastics Chemistry article entitled "Kinetics of epoxy polymerization," by Feltzin et al., vol. 24, No. 2, 1964, two pages.*
ChemBlink, "Methyl-5-norbornene-2,3-dicarboxylic anhydride,", 2011, one page.*

* cited by examiner

*Primary Examiner* — Robert Sellers
(74) *Attorney, Agent, or Firm* — The Webb Law Firm

(57) ABSTRACT

An one-part epoxy resin composition for the use of bonding of a coil which is preferable for impregnation of a motor and a generator for an automobile, especially of a drive motor-generator set for a hybrid car, which has superior storage stability and a cured resin of the composition has excellent adhesion properties, thermal stability, and reliability, are provided. The one-part epoxy resin composition of the present invention comprises (A) a bisphenol A type and/or F type epoxy resin which is in liquid form at room temperature, (B) methylnadic anhydride as a cycloaliphatic anhydride which is in liquid form at room temperature, and (C) a nitrogen-containing latent hardening accelerator.

4 Claims, No Drawings

ONE COMPONENT EPOXY RESIN COMPOSITION AND MOTOR OR DYNAMO USING THE SAME

TECHNICAL FIELD OF THE INVENTION

The present invention relates to a novel one component epoxy resin composition (one-part epoxy resin composition) and more specifically a novel one-part epoxy resin composition having good operability in an impregnation and fixation process when being used to from a coil or the like, a long shelf life, and the ability to provide a hardened resin which excels in thermal stability and reliability because it can exhibit a rather small deterioration in its shear bond strength even after being in a hot environment for a long period.

BACKGROUND ART

An enamel-insulated coil of a motor and/or a dynamo (generator) mounted in a vehicle such as a car or a train or in an industrial machine can be affected by humidity, water, dust, and the like in the environment of use of the coil. For example, when such substances in the environment penetrate and accumulate between coil wires, the electrical insulating properties of the enamel coating are deteriorated. This causes short-circuits between neighboring wires and consequently a deterioration of a motor or a reduction in the electromotive force of a generator.

Friction occasionally develops in an insulated coil between neighboring coil wires and/or between coil wires and the core of the coil due to vibrations of a motor or of a rotor of a generator which runs at high speed, or due to vibrations or impacts from equipment such as a car on which a motor or generator is mounted. There is the risk of the coil wires being severed due to this friction, which produces fatal problems for a motor or generator.

In order to prevent such deterioration in insulating properties and to protect against damage to or severing of an insulated coil, an insulated coil is impregnated with an epoxy resin and hardened so that adjoining coil wires adhere to each other and to the core of the coil.

Recently, the properties that the above-described epoxy resin composition needs to meet have become more severe especially for use in automobiles. Because of the trend that automobiles hybridizes in their drive mechanisms, motors for automobiles, especially a drive motor-generator sets are being decreased in size and upgraded in performance, and as a result, the winding density of insulated coils and/or the rotational speed becomes higher. Therefore, heat generation by motors, and especially by drive motor-generator set, increases. Therefore, the thermal stability of conventional epoxy resins for impregnation and fixation has become insufficient. In addition, because the reliability of the drive motor-generator set of a hybrid car needs to be as high as that of a conventional combustion engine, requirements concerning the thermal stability over time of a hardened resin and its stability in an impregnation and fixation process have become extremely severe. Furthermore, there is a persistent, strong demand for increase in the productivity of the impregnation and fixation process.

An example of a conventional epoxy resin composition is disclosed in Patent Document 1. The composition consists of an epoxy compound in liquid form selected from the group consisting of bisphenol F type epoxy resins and cycloaliphatic type epoxy resins; a bismaleimide; an acid anhydride in liquid form; and an amine series latent hardening accelerator. Although this composition has superior storage stability because it is a one-part agent, its shear bond strength after storage in a hot environment for a long time cannot sufficiently meet the present-day demand mentioned above. Even if its strength is at a certain level just after hardening, the strength deteriorates in a short period during storage in a hot environment, which increases risks such as disconnection of the coil wire.

In order to achieve the high thermal stability mentioned above, various improvements have been made to epoxy resin compositions. For instance, it has been proposed to add a bulking agent such as inorganic microparticles to the composition.

As a specific example, an epoxy resin composition for insulation of a coil in electric equipment and the like is disclosed in Patent Document 2. The composition consists of an epoxy compound, bismaleimide, a hardener of an acid anhydride, a hardening accelerator containing imidazole compounds, and a silica micropowder having a prescribed particle size distribution. In this composition, the particle size is strictly specified in order to avoid a decrease in the operability of the process, i.e., a deterioration with age in its viscosity, which is caused by the addition of the micropowder to improve the mechanical properties.

However, an improvement such as the addition of bulking agents eventually increases the number of parameters being controlled in the manufacturing process and increases the difficulty of process control. In addition, use of imidazole compounds in this composition increases the activity of the resin composition. Therefore, the compound cannot substantially be used in a one-part form in order to ensure storage stability and hence has to be used in a two-part form in many cases. Consequently, use of this compound obviously complicates the impregnation and fixation process, which runs counter to the trend of improving productivity. Furthermore, because the trend of decreasing the size of insulated coils is accompanied by an increase in the winding density of coil wires, a resin containing a micropowder often cannot reach between coil wires. In such a case, there is a concern that the composition cannot perform the basic task of bonding the coil wires. As mentioned above, because bulking agents which are added to improve thermal stability destabilize the impregnation and fixation process, it is difficult to apply the above-described composition to automobiles and the like, in which safety is important.

As another example, it was proposed in Patent Document 3 to specify the water content in a composition just after preparation. Namely, the one-part composition disclosed in Patent Document 3 consists of an epoxy compound having a plurality of epoxy groups in each molecule, a polycarboxylic acid anhydride in liquid form, and a hardener, wherein the water content just after preparation of the composition is less than 800 ppm by weight. This composition also increases the number of control parameters and causes additional problems in manufacturing. Particularly, because an additional control parameter is the water content, which is easily affected by the humidity of the environmental, a proper storage environment has to be developed for each component, and the mixing ratio of each component has to be modified according to the humidity where the blending process is performed.

Patent Document 1: JP63-251417A
Patent Document 2: JP07-128575A
Patent Document 3: JP2002-145996A

DISCLOSURE OF INVENTION

Problem to be Solved by the Invention

The general object of the present invention is to provide an epoxy resin composition for impregnation and fixation which is able to form a cured resin having such high thermal stability and reliability as to be easily applied to applications in which quality requirements are extremely high such as automobiles and particularly to a drive motor-generator set, which has superior storage stability, and which is easy to manufacture Means for Solving the Problem The inventors of the present invention made a diligent investigation to achieve the above object and realized the present invention.

Because it was obviously difficult to reduce the difficulty of manufacturing only by an approach of adding components to the composition to improve thermal stability, the inventors of the present invention performed an investigation in which optimizing interactions among basic components was instead emphasized. Consequently, it was found that methylnadic anhydride, which is the generic name for 1,2,3,6-tetrahydromethyl-3,6-methanophthalic anhydride shows high thermal stability when used with a nitrogen-containing latent hardening accelerator, although methylnadic anhydride was conventionally considered difficult to use for practical purposes due to its long curing time, and that a higher than conventional dose of the component enhances thermal stability.

Namely, the following one-part epoxy resin composition (one component epoxy resin composition) and a motor or generator (dynamo), especially a drive motor-generator set for an automobile, are provided by the present invention:

[1] A one-part epoxy resin composition characterized by comprising (A) a bisphenol A type and/or F type epoxy resin which is in liquid form at room temperature, (B) methylnadic anhydride as a cycloaliphatic anhydride which is in liquid form at room temperature, and (C) a nitrogen-containing latent hardening accelerator.

It is preferable that the above resin composition not contain an organic and/or inorganic particle, especially an inorganic particle such as a silica microparticle.

[2] The one-part epoxy resin composition as described above in [1], comprising (A) 100 parts by weight of the bisphenol A type and/or F type epoxy resin which is in liquid form at room temperature, (B) from 70 to 120 parts by weight of methylnadic anhydride as a cycloaliphatic anhydride which is in liquid form at room temperature, and (C) from 2 to 25 parts by weight of the nitrogen-containing latent hardening accelerator.

[3] The one-part epoxy resin composition as described above in [1] or [2], wherein the nitrogen-containing latent hardening accelerator is a hardening accelerator of an imidazole compound in the form of a microcapsule.

[4] A motor or generator characterized in that coils thereof are prepared by impregnation and fixation using the epoxy resin composition as described above in [1] to [3], which is preferable for the use of impregnation and fixation of a coil.

Effects of the Invention

The one-part epoxy resin composition of the present invention has superior storage stability, and a cured resin of the composition has excellent adhesion properties and thermal stability. Therefore, the one-part epoxy resin composition of the present invention is preferable for use for bonding wires of a coil to a core thereof, wherein the coil is for a motor and/or a generator mounted in an automobile, and especially a coil for a drive motor-generator set mounted in a hybrid car, the environment of use of which has become more severer because of decreases in the size and increases in the performance of such sets.

BEST MODE FOR CARRYING OUT THE INVENTION

Although only preferred embodiments are specifically illustrated and described herein, the present invention is not to be considered limited to the following embodiments, and it will be appreciated that many modifications and variations of the following embodiments are possible in light of the common knowledge of a person skilled in the art without departing from the spirit and intended scope of the invention.

An embodiment of a one-part epoxy resin composition of the present invention includes (A) a bisphenol A type and/or F type epoxy resin which is in liquid form at room temperature, (B) methylnadic anhydride as a cycloaliphatic anhydride which is in liquid form at room temperature, and (C) a nitrogen-containing latent hardening accelerator, all of which are basic components.

As the epoxy resin in the present invention, (A) a bisphenol A type and/or F type epoxy resin which is in liquid form at room temperature, which is an epoxy compound having a plurality of epoxy groups in each molecule, is used. The bisphenol A type epoxy resin or the bisphenol F type epoxy resin can be used alone, or both of them can be used in a mixture in prescribed proportions. It is more preferable to use the bisphenol A type epoxy resin by itself from the viewpoint of the balance between the viscosity and thermal stability of the resulting composition. A trifunctionalized or quad-functionalized epoxy resin, which is an epoxy resin having three or more epoxy groups in each molecule and being supplied by Japan Epoxy Resins Co., Ltd. under the trade name "Epicoat 630" or "Epicoat 604", cannot exhibit sufficient thermal stability.

As the hardener in the present invention, (B) methylnadic anhydride, which is a cycloaliphatic anhydride in liquid form at room temperature, is used. Although methyltetrahydrophthalic acid anhydride, methylhexahydrophthalic anhydride, and the like are among cycloaliphatic acid anhydrides which are in liquid form at room temperature other than methylnadic anhydride, such acid anhydrides cannot exhibit sufficient thermal stability.

The mixing ratio of methylnadic anhydride which is a hardener normally ranges from 70 to 120 parts by weight based on 100 parts by weight of the epoxy resin portion. When the mixing ratio is below this range, a hardening accelerator is required to compensate for the deficiencies of the hardener. On the other hand, when the ratio is higher than this range, it causes an increase in the amount of unreacted hardener, and a tendency for the qualities of the hardened resin, such as the shear bond strength, to deteriorate is observed. It is especially preferable for the amount of the hardener to range from 80 to 110 parts by weight from the viewpoint of achieving a good balance between thermal stability and storage stability.

The hardening accelerator used in the present invention can be a nitrogen-containing latent hardening accelerator, which is used for conventional epoxy resins composition. Among the nitrogen-containing latent hardening accelerators, a solid dispersion nitrogen-containing latent hardening accelerator is preferable from the viewpoint of storage stability over a long period because the component melts due to heating to function as a hardening accelerator while it is in the form of a solid and is insoluble in the epoxy resin at room temperature. Specific examples of the hardening accelerator include a single compound or a combination of two or more compounds selected from the group consisting of an imidazole compound which is in solid form at room temperature, dicyandiamide and its derivatives, an amine-epoxy adduct compound, an imidazole-epoxy adduct compound, an amine-urea adduct compound, a neutralized acidic or basic compound, and a complex compound which is a neutral salt. Among these compounds, an imidazole compound is more preferable from the viewpoint of the balance between the ability to accelerate hardening and thermal stability. As the imidazole compound, unsubstituted imidazole can be used, and an imidazole compound which is substituted at the 1- and/or 2-positions by groups such as methyl groups, phenyl groups, allyl groups, vinyl groups can be used.

Because the above-described imidazole compound has a high reactivity, it is preferable to react excessive quantities of the imidazole compound with an epoxy compound to produce an imidazole-epoxy adduct compound or to coat a capsule material on the imidazole compound to produce a microcapsule in order to improve storage stability. Among the imidazole-based compounds having improved storage stability, a microcapsule is especially preferable from the viewpoint of thermal stability. A specific example includes a microcapsule imidazole compound sold by Asahi Kasei Chemicals Co., Ltd. under the trade name "Novacure". When the winding density of coil wires is high, the smaller the microcapsule, the more homogeneous is the hardened resin. However, overly small microcapsules may agglutinate. Therefore it is preferable for the microcapsules to range from around 1 to around 10 micrometers.

The mixing ratio of the nitrogen-containing latent hardening accelerator preferably ranges from 2 to 25 parts by weight based on 100 parts by weight of the epoxy resin. If the mixing ratio of the hardening accelerator is below this range, its ability to produce acceleration may deteriorate when the content of the hardener is relatively large. On the other hand, if the ratio is above this range, it may worsen storage stability despite the fact that the hardening rate of the compound increases. In addition, an excess content of the hardening accelerator has a harmful effect on the shear bond strength due to a relative decrease in the amount of the acid anhydride hardener. It is preferable for the amount of hardening accelerator to range from 3 to 20 parts by weight from the viewpoint of the balance between acceleration and storage stability, and it is especially preferable for it to range from 4 to 10 parts by weight from the additional viewpoint of the shear bond strength.

As described above, the one-part epoxy resin composition of the present invention emphasizes optimization of basic components, but the composition can contain conventional additives of various types as needed. A bulking agent is one such additive. Because excessive addition of a bulking agent causes additional problems in manufacturing such as difficulty in controlling the degree of dispersion, the content of a bulking agent should be minimized. Examples of an inorganic bulking agent include calcium carbonate, silica, alumina, aluminum oxide, magnesium oxide, talc, clay, and the like. Each of these can be used alone or as a combination of two or more.

A thixotropic agent can be used to prevent dripping and give thixotropic properties to the composition. As a thixotropic agent, silica in the form of ultrafine particles, alumina in the form of ultrafine particles, calcium carbonate in the form of an ultrafine particle, and the like can be used alone or as a combination of two or more of the above materials. It is preferable that the content of the thixotropic agent also be minimized.

Examples of additives other than a bulking agent or a thixotropic agent include a surface agent for fillers such as a coupling agent, a surfactant, a colorant, an antifoaming agent, and the like.

It is preferable that the one-part epoxy resin composition for securing a coil not contain organic and/or inorganic particles, especially inorganic particles such as silica particles. As described above, these particles are occasionally added to the composition as a bulking agent, a thixotropic agent, or an adjuster of thermal expansion. However, when a coil is impregnated with a composition containing such particles, there is the possibility that the particles or the composition itself cannot pass through gaps between coil wires of the coil because the diameter of the particles or the diameter of agglutinated particles becomes larger than the size of the gap or the viscosity of the composition increases due to the addition of the particles. In such a case, the homogeneity of the contents of the composition in the coil worse is, and in the worse case, the composition cannot penetrate to inside the coil. Such a problem is considered to occur especially easily with a coil used for a drive motor-generator set mounted in a hybrid car because the winding density of the coil wires of the coil is high in order to increase its generated power. In addition, because the hardness of an inorganic particle is generally higher than that of an enamel coating layer, there is a fear of an enamel coating layer being worn by inorganic particles due to vibration during use, which causes a decrease in the insulating properties of the coil.

There are no particular limitations on a method of preparing the one-part epoxy resin composition of the present invention for use in bonding of a coil, which is preferable for impregnation. For instance, the composition can be prepared by homogeneously blending components (A) to (C) and various additives according to need. It is advantageous to previously sufficiently disperse and mix component (C) into component (A) and then to mix component (B) into the mixture from the viewpoint of operability and of avoiding a hardening reaction during the mixing procedure.

Although the present invention will be concretely described below with respect to examples, the invention should not be considered to be limited to these examples. Methods of measuring various physical properties and evaluating various characteristics are described below.

(1) Shear Bond Strength

The initial shear bond strength and the shear bond strength after 1000-hour aging treatment at 230 degrees C. were measured according to the method described in JIS K 6850. An SPCC-SD steel plate was used as a test specimen, and curing of a bonding composition was performed for 3 hours at 150 degrees C. Criteria for evaluating the shear bond strength were as follows:

◯ (OK): the decrease of the shear bond strength after the 1000-hour aging treatment at 230 degrees C. compared to the initial strength was less than 10% and x (NG): the decrease of the shear bond strength after the 1000-hour aging treatment at 230 degrees C. compared to the initial strength was at least 10%.

(2) Impregnation Properties

A rotor was prepared by winding an enameled copper wire with a diameter of 2 mm around a rotor core of a small generator so that the wire made five layers on the rotor core. This rotor was heated at 150 degrees C., and an epoxy resin composition was dropped on the rotor, to impregnate the rotator. The impregnated rotor was cured for three hours at 150 degrees C. and cut in the direction transverse to the winding direction. The degree of impregnation of the resin composition was observed for each layer and evaluated by the following criteria:

○ (OK): all layers of the wound coil wire were impregnated with the resin composition, and × (NG): Not all layers of the wound coil wire were impregnated with the resin composition and there were some portions which the resin did not reach.

(3) Storage Stability

The viscosity of an epoxy resin composition was measured just after preparation and after storage for 60 days at 25 degrees C. by a rotating viscometer (E type viscometer EHD, manufactured by TOKIMEC INC.) Measurement was performed at 25 degrees C. at a constant speed of 10 rpm. Other measurement conditions conformed with JIS K 7100.

Storage stability was evaluated by the following criteria:

○ (OK): the viscosity after storage for 60 days at 25 degrees was less than twice the viscosity just after preparation and × (NG): the viscosity after storage for 60 days at 25 degrees was at least twice the viscosity just after preparation.

EXAMPLE 1

Each component was weighed so that a resin composition was obtained in the following manner. A hardening accelerator was added to an epoxy resin and mixed for 20 minutes with a planetary mixer. Then, a hardener was added to the mixture and mixed for additional 30 minutes with the planetary mixer to prepare a one-part epoxy resin composition. Measurement of physical properties and evaluation of characteristics were performed on the resulting resin composition in the manner described above. The results are shown in Table 1.

An epoxy resin: 50 parts by weight of a bisphenol A type epoxy resin (EPICOAT828 produced by Japan Epoxy Resins Co., Ltd.)

A hardener in the type of a cycloaliphatic anhydride: 43.5 parts by weight of methylnadic anhydride A nitrogen-containing latent hardening accelerator: 2.3 parts by weight of an imidazole series microcapsule (a portion of Novacure HX3742 produced by Asahi Kasei Chemicals Co., Ltd.)

Novacure HX3742 consists of microcapsules and an epoxy resin in the proportion of 35 parts to 65, so the added amount of Novacure HX3742 was 6.5 parts by weight. Therefore, the content of the microcapsules was 4.2 parts by weight when the actual content of the epoxy resin was defined as 100 parts by weight.

EXAMPLE 2

An epoxy resin compound was prepared in a similar manner as for Example 1 except that 2.5 parts by weight of an imidazole-epoxy adduct were used as a nitrogen-containing latent hardening accelerator. Measurement and evaluation were performed in the same manner as for Example 1.

EXAMPLE 3

An epoxy resin compound was prepared in a similar manner as for Example 1 except that the content of Novacure HX3742 as a nitrogen-containing latent hardening accelerator was 66.0 parts by weight and the content of methyl methylnadic anhydride was 74.0 parts by weight, so the content of microcapsules was 25 parts by weight and the content of methylnadic anhydride was 80 parts by weight when the actual content of the epoxy resin was defined as 100 parts by weight. Measurement and evaluation were performed in the same manner as for Example 1.

EXAMPLE 4

An epoxy resin compound was prepared in a similar manner as for Example 1 except that 3.0 parts by weight of Novacure HX3742 as a nitrogen-containing latent hardening accelerator were used. In this case, the actual content of microcapsules was 2.0 parts by weight per 100 parts by weight of the epoxy resin. Measurement and evaluation were performed in the same manner as for Example 1.

EXAMPLE 5

An epoxy resin compound was prepared in a similar manner as for Example 1 except that 17.5 parts by weight of Novacure HX3742 as a nitrogen-containing latent hardening accelerator were used. In this case, the actual content of microcapsules was 10 parts by weight per 100 parts by weight of the epoxy resin. Measurement and evaluation were performed in the same manner as for Example 1.

COMPARATIVE EXAMPLE 1

An epoxy resin compound was prepared in a similar manner as for Example 1 except that methyltetrahydrophthalic acid anhydride (HN-2000, which is a product of Hitachi Chemical Company, Ltd.) was used as a hardener in a series of a cycloaliphatic anhydride. Measurement and evaluation were performed in the same manner as for Example 1.

COMPARATIVE EXAMPLE 2

An epoxy resin compound was prepared in a similar manner as for Example 1 except that dicyandiamide (DYCY#15, which is a product of Japan Epoxy Resins Co., Ltd.) was used as a hardener and dimethyl urea was used as a hardening accelerator. Measurement and evaluation were performed in the same manner as for Example 1.

COMPARATIVE EXAMPLE 3

An epoxy resin compound was prepared in a similar manner as for Example 1 except that 2-ethyl-4-methyl imidazole (Curezol 2E4MZ, which is a product of SHIKOKU CHEMICALS CORPORATION) was used as a hardening accelerator. Measurement and evaluation were performed in the same manner as for Example 1.

TABLE 1

|  | Shear bond strength | Impregnation properties | Storage stability |
|---|---|---|---|
| Example 1 | ○ (3%) | ○ | ○ (1.4) |
| Example 2 | ○ (5%) | ○ | ○ (1.4) |
| Example 3 | ○ (3%) | ○ | ○ (1.8) |
| Example 4 | ○ (7%) | ○ | ○ (1.3) |
| Example 5 | ○ (3%) | ○ | ○ (1.5) |
| Comparative Example 1 | × (>10%) | ○ | ○ (1.3) |
| Comparative Example 2 | × (>10%) | ○ | × (>2) |
| Comparative Example 3 | ○ (8%) | × | × (>2) |

In Table 1, the numerical values shown in parentheses in the column for the shear bond strength indicate the percent decrease in the shear bond strength, and those in the column for storage stability indicate the ratio of the viscosity (the viscosity after 60 days/the viscosity just after preparation).

As shown in Table 1, all the compositions of the Examples were satisfactory with respect to all items being evaluated, i.e., the shear bond strength, impregnation properties, and storage stability, while the compositions of the Comparative Examples were unsatisfactory with respect to one or more items.

It can be seen that the composition of Example 3 was slightly inferior in storage stability and the composition of Example 4 was slightly inferior in shear bond strength in comparison with Example 1, 2, or 5. These differences are significant even in view of the fluctuation of the results of evaluation. This indicates that there is an optimum range for the content of a nitrogen-containing latent hardening accelerator of the present invention.

The invention claimed is:

1. A one-part epoxy resin composition consisting of (A) 100 parts by weight of a bisphenol A and/or F epoxy resin which is in liquid form at room temperature, (B) from 70 to 120 parts by weight of methylnadic anhydride as a cycloaliphatic anhydride which is in liquid form at room temperature, and (C) from 2 to 25 parts by weight of a nitrogen-containing latent hardening accelerator,
   wherein the nitrogen-containing latent hardening accelerator is a hardening accelerator of an imidazole compound in the form of a microcapsule.

2. A motor or generator having coils thereof which are prepared by impregnation and fixing using the epoxy resin composition according to claim 1.

3. The one-part epoxy resin composition of claim 1, wherein said nitrogen-containing latent hardening accelerator is present in an amount of 4 to 10 parts by weight.

4. The one-part epoxy resin composition of claim 1, wherein said one-part epoxy resin composition has high impregnation properties, and
   wherein the impregnation properties are determined by winding 2 mm diameter enameled copper wire around a rotor core so as to form a winding having a winding direction and five layers on the rotor core, heating the rotor core and winding to 150° C. thereby forming a heated winding, dropping said one-part epoxy resin composition on said heated winding, thereby forming an impregnated winding, curing the impregnated winding at 150° C. for three hours, thereby forming a cured impregnated winding, cutting the cured impregnated winding in a direction transverse to said winding direction, and determining how many layers of said winding are impregnated with said one-part epoxy resin composition, wherein impregnation of all five layers of said winding corresponds to high impregnation properties.

* * * * *

UNITED STATES PATENT AND TRADEMARK OFFICE
CERTIFICATE OF CORRECTION

PATENT NO. : 8,372,922 B2  
APPLICATION NO. : 12/440694  
DATED : February 12, 2013  
INVENTOR(S) : Tetsushi Takata et al.

Page 1 of 1

It is certified that error appears in the above-identified patent and that said Letters Patent is hereby corrected as shown below:

Title Page, Column 1, insert the following Foreign Priority Data -- JAPAN PCT/JP2006/318049 filed 09/12/2006 --

Signed and Sealed this  
Twentieth Day of August, 2013

Teresa Stanek Rea  
*Acting Director of the United States Patent and Trademark Office*

UNITED STATES PATENT AND TRADEMARK OFFICE
CERTIFICATE OF CORRECTION

PATENT NO. : 8,372,922 B2  Page 1 of 1
APPLICATION NO. : 12/440694
DATED : February 12, 2013
INVENTOR(S) : Takata et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 392 days.

Signed and Sealed this
First Day of September, 2015

Michelle K. Lee
*Director of the United States Patent and Trademark Office*